United States Patent [19] [11] 3,935,175
Lugli et al. [45] Jan. 27, 1976

[54] PROCESS FOR THE POLYMERIZATION OF UNSATURATED COMPOUNDS

[75] Inventors: Gabriele Lugli; Alessandro Mazzei, both of San Donato Milanese; Gabriella Brandi, Milan, all of Italy

[73] Assignee: Snam Progetti S.p.A., San Donato Milanese, Italy

[22] Filed: Nov. 19, 1973

[21] Appl. No.: 417,077

[52] U.S. Cl............ 260/82.1; 260/85.3 R; 260/94.3; 260/94.9 C; 260/94.9 E
[51] Int. Cl....... C08d 1/14; C08d 1/18; C08d 1/20
[58] Field of Search............ 260/94.3, 82.1, 85.3 R, 260/94.9 C, 94.9 E

[56] References Cited
UNITED STATES PATENTS

| 3,676,411 | 7/1972 | Throckmorton et al....... 260/94.3 X |
| 3,689,471 | 9/1972 | Judy............................. 260/94.3 X |
| 3,753,967 | 8/1973 | Groff et al. ........................ 260/94.3 |

Primary Examiner—William F. Hamrock
Attorney, Agent, or Firm—Ralph M. Watson, Esq.

[57] ABSTRACT

An olefin or diolefin is polymerized, and mixtures thereof are copolymerized, in the presence of a catalyst system consisting of:
  a. a uranium compound consisting of $U(OCH_3)_4$, $U(OCH_3)_3 Cl$, $U(OC_4H_9)_4$, $U(OC_8H_{17})_4$, $U[N(C_2H_5)_2]_4$, $U[N(C_2H_5)_2]_3 Br$, $U(OCH_3)_5$, $U(O-i-C_4H_9)_5$;
  b. a reducing compound of a metal belonging to the 2nd or 3rd group of the periodic system, selected from the hydrides, mixed hydrides and alkyl derivatives thereof;
  c. a Lewis acid selected from $AlBr_3$, $AlI_3$, $AlCl_3$, $AlCl_3.OEt_2$, $Al R Cl_2$, $B Cl_3$ and $TiCl_4$, wherein R is a hydrocarbon radical.

12 Claims, No Drawings

PROCESS FOR THE POLYMERIZATION OF UNSATURATED COMPOUNDS

The present invention relates to a process for the polymerization of compounds containing at least one ethylene unsaturation.

More particularly the present invention relates to a process by which it is possible to obtain polymers starting from olefins or diolefins, and copolymers starting from olefins abd diolefins or mixtures of different diolefins, which is performed by using an uranium compounds base catalyst in the presence of reducing compounds of metals belonging to the first groups of the periodic system and Lewis acids. The obtained polymers have high molecular weight and, in the case of diolefins, highly stereospecific polymers or copolymers are obtained wherein the enchainment of the monomer units is mainly 1, 4 cis.

It is known that uranium compounds may be employed in catalyst systems for the polymerization of unsaturated compounds.

For instance the employment of ternary catalyst systems, one of the components being constituted by a particular uranium compound, is disclosed in the U.S. Pat. No. 3,676,411, according to which it is possible to polymerize unsaturated compounds, particularly conjugated dienes. However the reaction times are very long and very large amounts of catalyst are employed: therefore the process cannot be advantageously employed for industrial purposes. Moreover the obtained polymers do not present all the characteristics required for the production of very good manufactured articles. We have now found that, when use is made of uranium compounds different from the aforementioned ones, very high yields of very good polymers are obtained in very short times. For instance, in the case of polybutadiene, the obtained polymer has a cis content equal to or higher than 97–98% and this property gives the product a high crystallizability under stretch and very excellent mechanical properties.

A further advantage of the present invention, with respect to the known art, is the very small amount of catalyst which need be employed in performing the inventive process; this fact makes it possible to obtain a final product containing very low amounts of impurity which, on the other hand, can be easily removed as hereinafter described.

As pointed out above the polymerization process is carried out in the presence of a catalyst fundamentally constituted by uranium compounds having the following general formula $$U X_{n-m} Y_m$$

in which X is an alkoxy group, or an amine radical; Y is a halide selected from Cl$^-$, Br$^-$, I$^-$, or a pseudohalide such as, for instance, CN$^-$, CNS$^-$; n is an integer equal to the uranium valence, m is an integer in the range between 0 and n, the uranium valence being 4 or 5.

The uranium compounds may be used as such or when containing coordinated molecules of compounds selected from the so called Lewis bases such as esters, tertiary amines, alcohols, phosphines and some others.

Examples of compounds usefully employed according to the aforesaid class are:

U(OCH$_3$)$_4$, U(OCH$_3$)$_3$Cl, U(OC$_4$H$_9$)$_4$, U(OC$_8$H$_{17}$)$_4$, U[N(C$_2$H$_5$)$_2$]4, U[N(C$_2$H$_5$)$_2$]$_3$Br, U(OCH$_3$)$_5$, U(O-i-C$_4$H$_9$)$_5$.

The catalytic activity of the uranium base compound is enhanced in the presence of a reducing derivative of a metal belonging to the 2nd or 3rd group of the periodic system selected from hydrides, mixed hydrides or alkyl derivatives thereof such as for instance, AlR$_3$, AlR$_2$Cl, AlH$_3$, AlH$_2$NR$_2$, etc. and in the presence of a Lewis acid as for instance, AlBr$_3$, AlI$_3$, AlCl$_3$·OEt$_2$, AlRCl$_2$, BCl$_3$, TiCl$_4$ and some others wherein R is a hydrocarbon radical.

The molar ratio between reducing compound and uranium compound ranges from 5:1 to 200:1, whereas the ratio between the Lewis acid and the uranium compound ranges from 0.01 to 20.

The total catalyst concentration with respect to the monomer or monomers fed to the reaction ranges from $10^{-6}$ to $10^{-2}$ gram atoms of the uranium compound per mole of monomer.

A particular feature of the polymerization process of the present invention consists in the fact that it is possible to obtain very good reaction rates together with a high molecular weight even when the catalyst is in a very low amount with respect to the monomer fed to the reaction.

A further advantage obtainable by employing the catalyst of the present invention, is that it makes possible the practically total removal of the catalytic residues, because of the high density thereof, from the obtained products through a centrifugation of the polymer solution which allows the complete removal of the solid residues. The catalyst may be prepared either in the presence or the absence of the monomer; however it has been advantageous to prepare the same in the presence of very low amounts of the monomer itself, when it showed surprising longevity qualities and the activity thereof did not decay even after long periods of time; particularly, in the case of the diolefins, the employment of an aged catalyst was very efficacious for obtaining higher yields and a higher stereospecificity.

The polymerization reaction is carried out in the presence of solvents which are inert with respect to the catalyst, generally selected from saturated aliphatic, aromatic and cycloaliphatic hydrocarbons.

The polymerization temperature ranges from − 80°C to + 100°C, and all operations must be carried out in the absence of air and moisture, i.e. in an inert gas atmosphere, since the employed catalysts are affected by oxygen and protonic agents.

According to the inventive process it is possible to polymerize monomers belonging to the class of the conjugated diolefins, particularly those selected from 1,3-butadiene; isoprene; 2-3-dimethylbutadiene 1,3;2-phenylbutadiene 1,3;2-3-diphenylbutadiene 1,3; 1,3-pentadiene. The aforesaid monomers may be used also two by two in order to obtain highly stereospecific copolymers, for instance butadiene-isoprene and butadiene-pentadiene copolymers.

It is likewise possible to polymerize olefin monomers, such as ethylene, and to obtain copolymers constituted by olefins and diolefins.

At the end of the polymerization reaction the polymer may be recovered according to usual methods, or purified as aforesaid through centrifuging, by which it is possible to remove almost totally residual uranium, remained in the polymer itself.

All the aforesaid characteristics and further working properties will be clearer from consideration of the following examples, with which we purpose to illustrate the invention better, without limiting the aims thereof.

EXAMPLE 1

Under an inert atmosphere 100 cm³ of anhydrous n-hexane and then 0.1 mmole of $U(OCH_3)_4$, 0.10 mmole of $AlBr_3$ and 1.8 mmoles of $AlEt_3$ were introduced into a drink bottle having 200 cm³ capacity, through which an inert gas had been previously passed.

The bottle was shut by a neoprene plug and by a crown metallic plug perforated in such a way that it was possible to introduce a hypodermic needle. Then, by means of a hypodermic needle directly bound to a cylinder containing butadiene, 10 g of liquid monomer were introduced. The bottle was then put in a rotating bath thermostated at the temperature of 20°C for one hour.

At the end the bottle was opened and the content thereof was discharged into half a liter of methyl alcohol containing 1% of amine antioxidant. The coagulated polymer was dried under vacuum at room temperature for one night. The yield of solid polymer was, after one hour, 9.5 g equal to 95% of fed monomer.

The infrared analysis, carried out on a sample dissolved in carbon disulphide, gave rise to the following results: 1,4 cis = 97.8%; 1,4 trans = 1.3%; 1,2 = 0.9%. The intrinsic viscosity of the polymer measured at 30°C in toluene was 3.1 dl/g.

EXAMPLE 2

Preparation of solution A:

50 cm³ of hexane, 1.5 mmoles of $U(OCH_3)_4$, 0.75 mmole of $AlBr_3$, 40 mmoles of $Al(C_2H_5)_3$ and 0.5 g of butadiene were introduced into a 100 cm³ test tube, under Argon. The solution was aged under stirring. According to example 1, 100 cm³ of hexane, 0.5 cm³ of solution A (corresponding to 0.015 m atom of uranium) aged for 96 hours and then 19 g of butadiene were introduced into a bottle.

The yield of solid polymer was, after 1 hour, 11.5 g corresponding to 60% of fed monomer.

Infrared analysis: 1,4 cis = 98.4%; 1,4 trans = 1%; 1,2 = 0.6%.

Intrinsic viscosity: 5.20 dl/g.

EXAMPLE 3

By working according to example 2, 100 cm³ of hexane, 3.3 cm³ of solution A (corresponding to 0.1 m atom of uranium) aged for 48 days and then 8 g of liquid butadiene were introduced into a bottle. After one hour the monomer conversion was 100% and the obtained polymer showed the following characteristics:

Infrared analysis: 1,4 cis = 98%; 1,4 trans = 1.2%; 1,2 = 0.8%.

Intrinsic viscosity: 4.32 dl/g.

EXAMPLE 4–6

Butadiene was polymerized by means of $U(OCH_3)_4$ and some cocatalysts according to the procedure of example 1.

In every test use was made of 0.1 mmole of uranium salt in 100 cm³ of hexane, 0.05 mmole of Lewis acid and 1.8 mmoles of $AlEt_3$.

The reaction times were different and are reported on table 1.

TABLE 1

| Example N. | Catalyst mmole | Cocatalyst mmole | | Butadiene g | Yield g | % | Reaction Time | IR Analysis 1,4 cis | 1,4 trans |
|---|---|---|---|---|---|---|---|---|---|
| 4 | $U(OCH_3)_4$ 0.1 | $AlI_3$ 0.05 | $AlEt_3$ 1.8 | 15 | 12 | 80 | 1ʰ | 97.5 | 1.5 |
| 5 | $U(OCH_3)_4$ 0.1 | $AlEtCl_2$ 0.05 | $AlEt_3$ 1.8 | 8 | 4.8 | 60 | 2ʰ | 96.5 | 2.5 |
| 6 | $U(OCH_3)_4$ 0.1 | $TiCl_4$ 0.05 | $AlEt_3$ 1.8 | 10 | 6 | 60 | 17ʰ | 94.0 | 3.1 |

EXAMPLES 7–12

These examples show the influence of the Lewis acid/catalyst ratio on the yield of the butadiene polymerization.

It is to be noted that, while reference is made of only $AlBr_3$, similar behaviours are presented by other Lewis acids.

The reported yields were calculated after one hour reaction. The results are reported on table 2.

TABLE 2

| Example N. | Catalyst mmole | Cocatalyst mmole | | Butadiene g | Yield g | % | IR Analysis 1,4 cis% | 1,4 trans% | 1,2% |
|---|---|---|---|---|---|---|---|---|---|
| 7 | $U(OCH_3)_4$ 0.1 | $AlBr_3$ 0.1 | $AlEt_3$ 1.8 | 9 | 0.9 | 10 | 97.5 | 1.3 | 1.2 |
| 8 | $U(OCH_3)_4$ 0.1 | $AlBr_3$ 0.25 | $AlEt_3$ 1.8 | 11 | 6.3 | 57 | 97.1 | 1.6 | 1.3 |
| 9 | $U(OCH_3)_4$ 0.1 | $AlBr_3$ 0.04 | $AlEt_3$ 1.8 | 12 | 11.5 | 96 | 97.6 | 1.5 | 0.9 |
| 10 | $U(OCH_3)_4$ 0.1 | $AlBr_3$ 0.06 | $AlEt_3$ 1.8 | 10 | 9.5 | 95 | 97.4 | 1.5 | 1.1 |
| 11 | $U(OCH_3)_4$ 0.1 | $AlBr_3$ 0.08 | $AlEt_3$ 1.8 | 9 | 7.2 | 80 | 97.2 | 1.8 | 1.0 |
| 12 | $U(OCH_3)_4$ 0.1 | $AlBr_3$ 0.1 | $AlEt_3$ 1.8 | 8 | 1.2 | 15 | 96.9 | 1.7 | 1.4 |

EXAMPLES 13–17

In these examples the uranium compound employed for the butadiene polymerization was the reaction product between $UCl_4$ and $LiOCH_3$ at 1:3 ratio in methyl alcohol.

In the examples reported on Table 3 use was made of 0.1 mmole of uranium compound, various $AlBr_3$ ratios and an $AlEt_3$ fixed ratio.

The reported yields were calculated after 1 hour reaction.

TABLE 3

| Example N. | Catalyst mmole | | Cocatalyst mmole | | Butadiene g | Yield g | % | IR Analysis 1,4 cis% | 1,4 trans% | 1,2% |
|---|---|---|---|---|---|---|---|---|---|---|
| 13 | U(OCH$_3$)$_3$Cl 0.1 | AlBr$_3$ 0.01 | AlEt$_3$ 1.8 | | 9 | 3.8 | 42 | 97.1 | 1.8 | 1.1 |
| 14 | U(OCH$_3$)$_3$Cl 0.1 | AlBr$_3$ 0.03 | AlEt$_3$ 1.8 | | 11 | 10 | 89 | 96.7 | 1.9 | 1.4 |
| 15 | U(OCH$_3$)$_3$Cl 0.1 | AlBr$_3$ 0.05 | AlEt$_3$ 1.8 | | 12 | 7 | 60 | 96.7 | 2.1 | 1.2 |
| 16 | U(OCH$_3$)$_3$Cl 0.1 | AlBr$_3$ 0.07 | AlEt$_3$ 1.8 | | 10 | 3.3 | 33 | 97.3 | 1.8 | 0.9 |
| 17 | U(OCH$_3$)$_3$Cl 0.1 | AlBr$_3$ 0.10 | AlEt$_3$ 1.8 | | 12 | 1.4 | 12 | 96.9 | 2.0 | 1.1 |

EXAMPLE 18

According to the procedure of example 1, 100 cm³ of hexane, 0.1 mmole of U(NEt$_2$)$_4$, 0.1 mmole of AlBr$_3$ and 1.8 mmoles of AlEt$_3$ were introduced into a bottle. Then 12g of liquid butadiene were added. After 20 hours 7.7 g of polymer were obtained corresponding to 64% of the fed monomer. Infrared analysis: 1,4 cis = 97.7%; 1,4 trans = 1.8%; 1,2 = 0.5%.

Intrinsic viscosity: 4.82 dl/g.

EXAMPLE 19

According to the procedure of example 1, 100 cm³ of hexane, 0.1 mmole of U(OCH$_3$)$_4$, 0.05 mmole of AlBr$_3$ and 2 mmoles of AlH(i-C$_4$H$_9$)$_2$ were introduced into a bottle.

Then 10 g of butadiene as a liquid were added.

After 1 hour 10 g of polymer were obtained corresponding to 100% of the fed monomer.

Infrared analysis: 1,4 cis = 97.2%; 1,4 trans = 1.5%; 1,2 = 1.3%.

EXAMPLE 20

According to the procedure of example 1, 100 cm³ of hexane, 0.1 mmole of U(OCH$_3$)$_4$, 0.05 mmole of AlBr$_3$ and 2 mmoles of Al(i-C$_4$H$_9$)$_3$ were introduced into a bottle. Then 12 g of liquid butadiene were added which, after 1 hour, was completely changed into a polymer.

I.R. analysis: 1,4 cis = 98.1%; 1,4 trans = 1.5%; 1,2 = 0.4%.

EXAMPLE 21

This example discloses the polymerization of pentadiene 1-3 at 75% of trans isomer.

According to the procedure of example 2, a bottle was fed by 100 cm³ of hexane, 3.3 cm³ of solution A (corresponding to 0.1 m atom) aged for 2 hours and then 20 cm³ (13.6 g) of monomer.

After 20 hours 9.8 g of polymer were obtained corresponding to 72% of the introduced monomer.

At infrared and NMR analysis, the polymer was seen as totally consisting of 1.4 enchaiment unities, it being practically free from 1.2 or 3.4 addition types. Particularly the 1.4 enchaiment is constituted by 85% of 1,4 cis unities.

EXAMPLE 22

20 cc (14.6 g) of 2,3-dimethylbutadiene were polymerized according to the procedure and by using the same catalyst of the example 21. After 17 hours 2g of crystalline polymer were obtained which, at X rays, showed an 1,4 cis type enchaiment at 100%.

EXAMPLE 23

According to the procedure of example 2 a bottle was introduced by 100 cm³ of hexane, 3.3 cm³ of solution A (corresponding to 0.1 m atom of uranium) aged for 2 hours and then 15 cm³ (10.1 g) of monomer (isoprene).

After 2 hours, 6 g of polymer were obtained corresponding to 60% of fed monomer.

Infrared analysis: 1,4 cis = 94%, 3.4 = 6%

Intrinsic viscosity = 2.74 dl/g.

EXAMPLE 24

The present test relates to a copolymerization, carried out according to the procedure of example 2, of a mixture formed by 5.1 g of 1,3 pentadiene and 10.2 g of butadiene by means of 3.3 cm³ of 48 hours old solution A. The polymerization was carried out at 20°C for 16 hours and gave rise to 9.6 g of polymer which, at IR examen, was analyzed as 90% of polybutadiene mainly in the cis form, and 10% of polypentadiene 1,4.

EXAMPLE 25

A mixture of 6 g of butadiene and 4 g of isoprene was copolymerized by means of 3.3 cm³ of 48 hours old solution A, according to the procedure of example 2.

After 2 hours reaction of 20°C, 4.2 g of polymer were obtained containing 25% of isoprene.

EXAMPLES 26–28

The ethylene polymerization is reported by means of catalytic systems based on U(OCH$_3$)$_4$ and U(O-i-C$_4$H$_9$)$_5$, triethyaluminium and AlBr$_3$ as Lewis acid. The operation was carried out in an autoclave equipped with an anchor stirrer. The catalyst solution was prepared by introducing into a test tube, under Argon, solvent, uranium compound, Lewis acid, alkyl aluminium and by ageing under stirring for 30 minutes. After this time the solution was transferred into an autoclave which was then charged by the monomer. The polymerization temperature was kept at 30°C during the whole operation and, after 1 hour, the autoclave was aired and the content poured into a glass containing methyl alcohol and hydrochloric acid. The recovered polymer was dried in a stove, under vacuum at 40°C, for 1 night.

The obtained results are reported on Table 4.

TABLE 4

| Example N | Solvent g | Uranium compound | Moles $\times 10^{-3}$ | Al(Et)$_3$ Moles $\times 10^{-3}$ | Lewis acid Moles $\times 10^{-3}$ | Ethylene | T°C Polym. | Time h | Solid polymer g | Conversion % |
|---|---|---|---|---|---|---|---|---|---|---|
| 26 | Toluene g 300 | U(OCH$_3$)$_4$ | 0.4 | 8 | 0.12 | 22 | 30° | 1 | 18 | 82 |
| 27 | Hexane g 250 | U(OCH$_3$)$_4$ | 0.4 | 4 | 0.28 | 21 | 30° | 1 | 16 | 76 |
| 28 | Hexane g 250 | U(O-i-C$_4$H$_9$)$_5$ | 0.3 | 6 | 0.15 | 30 | 30° | 1 | 21 | 70 |

EXAMPLES 29–31

By working according to example 26, a copolymerization was performed between ethylene and conjugated diolefins such as butadiene 1,3 and isoprene by using catalyst formed by a tetravalent or pentavalent uranium alcoholate, a Lewis acid, an aluminium alkyl.

The infrared analysis, carried out on the obtained solid polymers, always showed the presence of copolymerized diolefin mainly having 1–4 structure. The obtained results are reported on table 5.

TABLE 5

| Ex. N. | Solvente g | Uranium compound Moles $\times 10^{-3}$ | Lewis acid Moles $10^{-3}$ | Al(Et)$_3$ Moles $\times 10^{-3}$ | Monomers diolefin g | Monomers olefin g | T° | Time h | Solid polymer yield g | Polymer analysis (infrared) % diolefin in polymer | Polymer analysis (infrared) % 1-4 unities in diolefins |
|---|---|---|---|---|---|---|---|---|---|---|---|
| 29 | Hexane 250 | U(OCH$_3$)$_4$ 0.4 | AlBr$_3$ 0.24 | Al(Et)$_3$ 8 | Isoprene 7 | Ethylene 40 | 30° | 8 | 32 | 17 | ≥90 |
| 30 | Hexane 250 | U(O-iC$_4$H$_9$)$_5$ 0.3 | AlBr$_3$ 0.21 | Al(Et)$_3$ 6 | Butadiene 5 | Ethylene 30 | 30° | 6 | 15 | 20 | ≥95 |
| 31 | Hexane 250 | U(O-iC$_4$H$_9$)$_5$ 0.4 | AlBr$_3$ 0.2 | Al(Et)$_3$ 8 | Isoprene 5 | Ethylene 34 | 30° | 10 | 20 | 20 | ≥90 |

EXAMPLES 32–37

According to the procedure of example 1, butadiene was polymerized by using catalysts formed by a pentavalent uranium alcoholate, AlBr$_3$ and AlEt$_3$.

The catalytic solution, prepared separately, was either used at once or aged in the presence or absence of monomer for some time.

The conditions of the results of the tests are illustrated in table 6.

TABLE 6

| Ex. N. | U(O-iC$_4$H$_9$)$_5$ moles $\times 10^{-3}$ | AlBr$_3$ moles $\times 10^{-3}$ | Al(Et)$_3$ moles $\times 10^{-3}$ | Ageing without monomer | Ageing with monomer | Monomer g | T°C of polymer | Time h | Solid polymer g | Conversion % | Infrared analysis 1-4 cis | Infrared analysis 1-4 trans | Infrared analysis 1-2 |
|---|---|---|---|---|---|---|---|---|---|---|---|---|---|
| 32 | 0.1 | 0.05 | 2 | — | — | Butadiene 18 | 20 | 6 | 7 | 39 | 98.0 | 1.5 | 0.5 |
| 33 | 0.1 | 0.10 | 2 | — | — | Butadiene 15 | 20 | 6 | 5.5 | 27.5 | 97.5 | 1.5 | 1.0 |
| 34 | 0.1 | 0.05 | 2 | 20$^h$ | — | Butadiene 13 | 20 | 0.5 | 12 | 92 | 97.0 | 1.5 | 1.5 |
| 35 | 0.1 | 0.05 | 2 | — | 5$^h$ | Butadiene 10 | 20 | 0.5 | 6 | 60 | 97.0 | 2.0 | 1.0 |
| 36 | 0.1 | 0.05 | 2 | 92$^h$ | — | Butadiene 12 | 20 | 0.5 | 11.5 | 96 | 97.0 | 1.5 | 1.5 |
| 37 | 0.1 | 0.05 | 2 | — | 75$^h$ | Butadiene 13 | 20 | 0.5 | 11.5 | 88 | 97.5 | 1.5 | 1.0 |

EXAMPLES 38–39

They relate to the polymerization of butadiene and isoprene with catalysts formed by a tetravalent uranium alcoholate having a long alkyl chain such as U(O-n C$_8$H$_{17}$)$_4$, AlBr$_3$ and Al(Et)$_3$.

The modalities and the results are reported on table 7.

TABLE 7

| Example N. | Solvent | U(OC$_8$H$_{17}$)$_4$ moles $\times 10^{-3}$ | AlBr$_3$ moles $\times 10^{-3}$ | AlEt$_3$ moles $\times 10^{-3}$ | Monomer g | T°C of polym. | Time h | Solid polymer | Conver. % | Infrared analysis 1-4 cis | Infrared analysis 1-4 trans | Infrared analysis 1-2 | Infrared analysis 3-4 |
|---|---|---|---|---|---|---|---|---|---|---|---|---|---|
| 38 | Hexane 100 | 0.1 | 0.05 | 2 | Butadiene 18 | 20 | 18 | 8 | 66 | 96.5 | 3 | 0.5 | |
| 39 | Hexane 100 | 0.1 | 0.05 | 2 | Isoprene 20 | 20 | 18 | 8 | 40 | 94.5 | | | 5.5 |

EXAMPLE 40

3 l of anhydrous n-hexane, 3.5 mmoles of $U(OCH_3)_4$, 1.75 mmoles of $AlBr_3$ and 70 mmoles of $Al(C_2H_5)_3$ were introduced into an autoclave having 5 l capacity, equipped with an anchor stirrer and a cooling jacket. Then 250 g of butadiene were introduced under stirring and by keeping the temperature inside the reactor at 20°C for the whole reaction time.

The reaction was stopped after two hours and there was added to the polymer, after it had been coagulated in methyl alcohol, an amine antioxidant (0.2%). 200 g of polymer were obtained corresponding to a yield of 80%.

IR analysis: 1,4 cis = 97.5%; 1,4 trans = 2%; 1,2 = 0.5%.

The polymer physical properties were the following ones:

| | |
|---|---|
| intrinsic viscosity | 2.72 |
| Mooney viscosity | 36.5 |
| mix Mooney viscosity | 56 |
| $\overline{\overline{Mw}} = 2.81$ | |
| $\overline{Mn}$ | |

($\overline{Mw}$ = weighted average molecular weight)
($\overline{Mn}$ = arithmetical average molecular weight)

The technological properties were the following ones:

| | | | | | | | |
|---|---|---|---|---|---|---|---|
| Polymer workability | very good | | | | | | |
| Mix workability | very good | | | | | | |
| Vulcanization at 145°C for | 25' | 30' | 45' | 60' | 90' | 120' | 180' |
| Modulus at 300% kg/cm² (ASTM D 412) | 52 | 60 | 70 | 72 | 80 | 80 | 80 |
| Ultimate tensile stress kg/cm² (ASTM D 412) | 185 | 194 | 218 | 219 | 223 | 210 | 202 |
| Elongation at break % (ASTM D 412) | 630 | 600 | 595 | 590 | 560 | 550 | 520 |
| Tearing charge kg/cm (ASTM D 624) | | | 85 | 55 | 50 | | |
| ΔT°C HBu (ASTM D 623 method A) | | | 23 | | 21 | | |
| Abrasion mm³ (DIN 535 16 (1 kg) | | | 22 | | 20 | | |

The vulcanization recipe was the following one:

| | |
|---|---|
| Polymer | 100.0 |
| NBS St. HAF Black | 50.0 |
| NBS St. S | 1.75 |
| NBS St. Stearic Acid | 2.0 |
| Resin 731 D | 5.0 |
| Aromatic Oil | 5.0 |
| Nobs No. 1 | 0.9 |
| AO 2246 | 1.0 |

NBS = National Bureau of Standard.

EXAMPLE 41

According to the procedure of example 40, 3 l of hexane, 0.5 mmole of $U(OCH_3)_4$, 0.25 mmole of $AlBr_3$, 25 mmoles of $AlEt_3$ and 5 g butadiene were introduced into the autoclave. The whole was aged under stirring for 24 hours. 260 g of butadiene were then introduced. They were polymerized for two hours and, at end, the reaction was stopped by 5 cm³ of methyl alcohol in Argon under stirring. Then air was blown for 2 minutes into the polymer solution. Then 200 g of solution were drawn which were dried in a rotating evaporator. 12 g of polymer were recovered wherein the ash analysis showed a metallic uranium content equal to 900 ppm. The residual solution was centrifuged at 5,000 rounds per minute for 10 minutes.

The centrifuged solution was evaporated and the recovered polymer showed an ash content of 25 ppm of metallic uranium. 130 g of polymer were totally recovered corresponding to a 50% conversion.

IR analysis: 1,4 cis = 98.5%; 1,4 trans = 0.9%; 1,2 = 0.6%.

The physical properties of the polymer were the following ones:

| | |
|---|---|
| intrinsic viscosity | 5.36 |
| Mooney viscosity | 73.5 |
| mix Mooney viscosity | 88.5 |
| $\overline{MW} = 3.82$ | |
| $\overline{Mn}$ | | semicrystallization time (at −20°C as minute) 10 minute.

The technological properties were the following ones:

| | | | | | |
|---|---|---|---|---|---|
| polymer workability: | good | | | | |
| mix workability | good | | | | |
| vulcanization at 145°C for | 20' | 30' | 45' | 90' | 180' |
| modulus at 300% kg/cm² | 64 | 73 | 87 | 99 | 96 |
| ultimate tensile stress kg/cm² | 200 | 220 | 230 | 215 | 210 |
| elongation at break % | 570 | 530 | 515 | 470 | 460 |
| tearing charge kg/cm | | | 90 | 60 | 50 |
| ΔT°C HBU | 20.5 | 20 | | | |
| abrasion mm³ | | | 20 | 18 | |

What we claim is:

1. Process for the polymerization and copolymerization of unsaturated compounds selected from the group consisting of olefins and diolefins wherein the polymerization reaction is carried out in the presence of a catalyst consisting of
   a. an uranium compound selected from the group consisting of $U(OCH_3)_4$, $U(OCH_3)_3Cl$, $U(OC_4H_9)_4$, $U(OC_8H_{17})_4$, $U[N(C_2H_5)_2]_4$, $U[N(C_2H_5)_2]_3Br$, $U(OCH_3)_5$, $U(O-i-C_4H_9)_5$;
   b. a reducing compound of a metal belonging to the 2nd or 3rd group of the periodic system selected from the hydrides, mixed hydrides and alkylderivatives thereof; and
   c. a Lewis acid selected from $AlBr_3$, $AlI_3$, $AlCl_3 \cdot OEt_2$, $AlRCl_2$, $BCl_3$, $TiCl_4$ wherein R is a hydrocarbon radical.

2. Process according to claim 1, wherein the polymerization reaction is carried out at a molar ratio between reducing compound and uranium compound ranging from 5:1 to 200:1.

3. Process according to claim 1, wherein the polymerization reaction is carried out at a molar ratio between the Lewis acid and the uranium compound ranging from 0.01 to 20.

4. Process according to claim 1, wherein the polymerization reaction is carried out in the presence of a total amount of catalyst with respect to monomer fed to the reaction ranging from $10^{-6}$ to $10^{-2}$ gram atom of uranium compound per monomer mole.

5. Process according to claim 1, wherein the polymerization reaction is carried out in the presence of a solvent inert with respect to the catalyst, selected from the saturated aliphatic, aromatic and cycloaliphatic hydrocarbons.

6. Process according to claim 1, wherein the polymerization reaction is carried out at a temperature ranging from $-80°$ to $+100°C$.

7. Process according to claim 1, wherein the polymerization reaction is carried out by starting with a conjugated diolefin, an olefin, a mixture of diolefins or a diolefin-olefin mixture.

8. Process according to claim 7, wherein the polymerization reaction is carried out by starting with a diolefin selected from butadiene, 1,3-pentadiene, 2,3-dimethyl-butadiene, isoprene.

9. Process according to claim 7, wherein the polymerization reaction is carried out by starting with ethylene.

10. Process according to claim 7, wherein the polymerization reaction is carried out by starting with 1,3-pentadiene-butadiene or butadiene-isoprene mixtures.

11. Process according to claim 7 characterized in that the polymerization reaction is carried out by starting with ethylene-butadiene or ethylene-isoprene mixtures.

12. Process according to claim 1, wherein the catalytic residuals are removed from the polymer solution by means of a centrifugation.

* * * * *

UNITED STATES PATENT AND TRADEMARK OFFICE
CERTIFICATE OF CORRECTION

PATENT NO. : 3,935,175
DATED : January 27, 1976
INVENTOR(S) : Gabriele Lugli, et al It is certified that error appears in the above-identified patent and that said Letters Patent are hereby corrected as shown below:

First page, after line "[21]", insert the following lines:

-- [30] Foreign Application Priority Data

November 29, 1972     Italy .... 32,206/72 --,

First page, at the end of item "[56]" insert:

-- 3,579,493    5/1971    Ziegler, et al .... 260/94.9 --.

Col. 1, line 11, correct the spelling of "and", line 67, change "$U[N(C_2H_5)_2]4$" to read

-- $U[N(C_2H_5)_2]_4$ --.

Col. 10, line 34, change "$MW = 3.82$" to read -- $\frac{\overline{Mw}}{\overline{Mn}} = 3.82$ --, line 50, delete "Mn", next to the last line, "20.5" should be moved one column to the right, and "20" should be moved one column to the right.

Signed and Sealed this first Day of June 1976

[SEAL]

Attest:

RUTH C. MASON
*Attesting Officer*

C. MARSHALL DANN
*Commissioner of Patents and Trademarks*